(No Model.)
C. A. SMITH.
RECEPTACLE FOR FEEDING GRAIN TO LIVE STOCK.
No. 472,316. Patented Apr. 5, 1892.
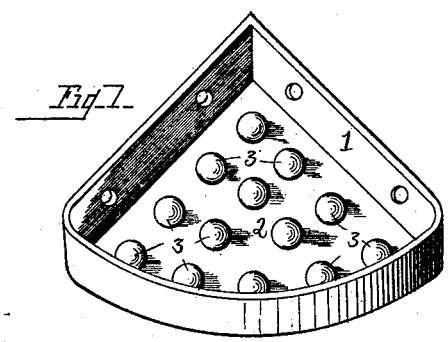
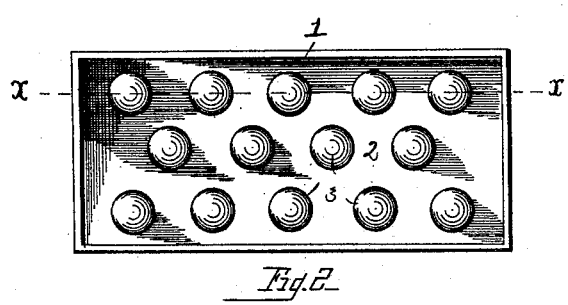
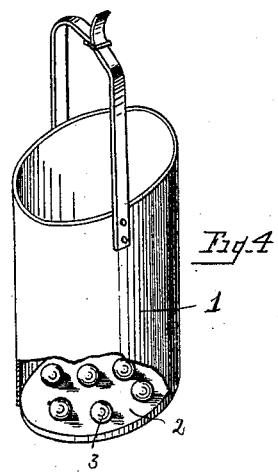
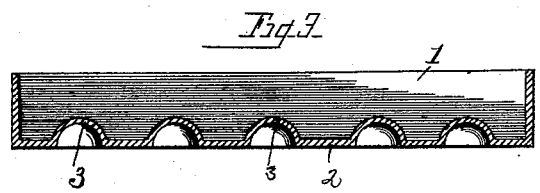
WITNESSES
Carroll J. Webster.
Grace E. Lehaney
INVENTOR
Charles A. Smith
By William Webster
Atty

UNITED STATES PATENT OFFICE.

CHARLES A. SMITH, OF TOLEDO, OHIO, ASSIGNOR OF ONE-HALF TO GEORGE WORTS, OF SAME PLACE.

RECEPTACLE FOR FEEDING GRAIN TO LIVE STOCK.

SPECIFICATION forming part of Letters Patent No. 472,316, dated April 5, 1892.

Application filed October 31, 1891. Serial No. 410,427. (No model.)

*To all whom it may concern:*

Be it known that I, CHARLES A. SMITH, of Toledo, in the county of Lucas and State of Ohio, have invented certain new and useful Improvements in Receptacles for Feeding Grain to Stock; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a receptacle for feeding grain to stock, and has for its object to form a feed-box, nose-bag, or manger of such construction that the animal to be fed is obliged to eat grain slowly, thereby allowing time for the mastication of the food and consequently perfect assimilation thereof with the gastric juices.

In the ordinary form of receptacle for feeding grain to stock the bottom is flat, thereby allowing the animal to feed faster than is possible to thoroughly masticate the grain, and as a consequence the grain enters the stomach in its normal state. I have overcome this objection by forming the food-receptacle with hemispherical projections upon the bottom, whereby the animal in feeding is obliged to gather the food from between the projections, which necessitates slow feeding or time to masticate the grain between the intervals that necessarily exist between each succeeding mouthful of grain.

My invention consists in forming the bottom of the feed-receptacle with upwardly-projecting portions in such arrangement that the grain shall rest between the same and gravitate to the bottom with the spaces between the projections of an area to allow of feeding from the same of an amount of grain only such as will gravitate thereto.

The invention further consists in forming the receptacle for feed with projections so disposed that the entire amount of grain deposited therein may be accessible to the animal feeding.

In the drawings, Figure 1 is an elevation of an angular feed-trough constructed in accordance with my invention. Fig. 2 is a plan view of a rectangular manger with the same construction of bottom. Fig. 3 is a longitudinal vertical section of the same on lines $x\ x$, Fig. 2. Fig. 4 is an elevation of a feed-bag with a portion broken away to disclose the bottom with a similar construction.

1 designates the sides of the receptacle; 2, the bottom, formed with projections 3, preferably of hemispherical shape, to form a smooth exterior, in order to cause the food to gravitate toward the bottom, the spherical form being preferable as forming a smooth contour for the nose of the animal, the entire receptacle being preferably formed of metal to not only cheapen the manufacture, but prevent the gluten and saliva from absorbing and fermenting.

The advantages will be apparent. The feed is placed in the receptacle and as the animal feeds therefrom, instead of voraciously gathering a greater quantity of feed than is possible to masticate at one time, it is compelled to exercise the time in gathering the feed necessary to masticate that already collected, and, as a consequence, all the feed enters the stomach in a masticated condition, thereby insuring proper digestion.

By reason of the hemispherical contour of the projections the feed gravitates to the bottom, and there is an absence of sharp projections to injure the mouth of the animal, another advantage being that it is possible for the animal to collect all the grain or feed from between the projections, thereby avoiding fermentation of the same. I therefore prefer the hemispherical form, although it will be apparent that I may vary the form of the projections without departing from the spirit of my invention.

What I claim is—

1. In a feed-receptacle, a bottom portion formed with projections having an incline toward the bottom, whereby there are plane communicating surfaces formed upon the bottom.

2. As an article of manufacture, a receptacle for feed formed with inclosing sides and a bottom part having hemispherical projections, whereby there are plane communicating surfaces formed upon the same.

In testimony that I claim the foregoing as my own I hereby affix my signature in presence of two witnesses.

CHARLES A. SMITH.

Witnesses:
 WILLIAM WEBSTER,
 CARROLL J. WEBSTER.